(12) United States Patent
Eberstaller

(10) Patent No.: US 9,098,950 B2
(45) Date of Patent: Aug. 4, 2015

(54) METHOD AND SYSTEM FOR THE USER-SPECIFIC INITIALIZATION OF IDENTIFICATION DEVICES IN THE FIELD

(75) Inventor: Bernd Eberstaller, Eichgraben (AT)

(73) Assignee: Kapsch TrafficCom AG, Vienna (AT)

( * ) Notice: Subject to any disclaimer, the term of this patent is extended or adjusted under 35 U.S.C. 154(b) by 1817 days.

(21) Appl. No.: 11/718,676

(22) PCT Filed: Sep. 21, 2005

(86) PCT No.: PCT/AT2005/000378
§ 371 (c)(1),
(2), (4) Date: May 4, 2007

(87) PCT Pub. No.: WO2006/050543
PCT Pub. Date: May 18, 2006

(65) Prior Publication Data
US 2009/0055936 A1    Feb. 26, 2009

(30) Foreign Application Priority Data
Nov. 9, 2004    (AT) ................. A 1865/2004

(51) Int. Cl.
*G06F 11/30*    (2006.01)
*G07B 15/00*    (2011.01)
(Continued)

(52) U.S. Cl.
CPC ............. *G07B 15/00* (2013.01); *G06F 21/31* (2013.01); *G06F 21/34* (2013.01); *G06F 21/42* (2013.01); *G06Q 20/3552* (2013.01); *G06Q 20/3555* (2013.01); *G07F 7/1008* (2013.01);
(Continued)

(58) Field of Classification Search
CPC .................................. G06F 21/72; G06F 21/10
USPC ............................................. 713/189; 726/28
See application file for complete search history.

(56) References Cited

U.S. PATENT DOCUMENTS 4,650,975 A    3/1987  Kitchener
6,161,182 A *  12/2000 Nadooshan ................... 713/172
(Continued)

FOREIGN PATENT DOCUMENTS

DE    39 27 270    2/1991
EP    0 730 253    9/1996
(Continued)

OTHER PUBLICATIONS

Notification of Transmittal of Translation of the International Preliminary Report on Patentability (1 page), International Preliminary Report on Patentability (1 page) and translation of Written Opinion of the International Searching Authority (4 pages) mailed on May 24, 2007, in International Application No. PCT/AT2005/000378.

*Primary Examiner* — Anthony Brown
(74) *Attorney, Agent, or Firm* — Fiala & Weaver P.L.L.C.

(57) ABSTRACT

The invention relates to a method and system for the user-specific initialization of identification devices in the field, particularly on-board units in road toll systems, based on a central facility, whereby each identification device, when delivered, has a unique device identification to which, in the central facility, a unique user identification is assigned, and in the central facility, an initialization PIN is generated from the device identification and from the user identification and is transmitted to the identification device from which the identification device, based on its device identification, computes the user identification for the user-specific initialization.

28 Claims, 3 Drawing Sheets

(51) Int. Cl.
*G06F 21/31* (2013.01)
*G06F 21/34* (2013.01)
*G06F 21/42* (2013.01)
*G06Q 20/34* (2012.01)
*G07F 7/10* (2006.01)

(52) U.S. Cl.
CPC . *G06F2221/2117* (2013.01); *G06F 2221/2129* (2013.01)

(56) References Cited

U.S. PATENT DOCUMENTS

| | | | |
|---|---|---|---|
| 6,213,396 | B1 | 4/2001 | Thoreau et al. |
| 6,980,660 | B1 * | 12/2005 | Hind et al. .................. 380/282 |
| 2003/0212894 | A1 * | 11/2003 | Buck et al. .................. 713/184 |
| 2004/0187018 | A1 * | 9/2004 | Owen et al. .................. 713/200 |
| 2004/0212517 | A1 * | 10/2004 | Inoue .......................... 340/905 |
| 2005/0279831 | A1 * | 12/2005 | Robinson et al. ............ 235/384 |
| 2009/0158029 | A1 * | 6/2009 | Wheeler et al. .............. 713/155 |

FOREIGN PATENT DOCUMENTS

| | | |
|---|---|---|
| EP | 1 233 570 | 8/2002 |
| GB | 2 347 248 | 8/2000 |
| WO | WO 01/67402 | 9/2001 |

* cited by examiner

METHOD AND SYSTEM FOR THE USER-SPECIFIC INITIALIZATION OF IDENTIFICATION DEVICES IN THE FIELD

CROSS-REFERENCE TO RELATED APPLICATIONS

This application claims the benefit of PCT International Patent Application No. PCT/AT2005/000378, filed Sep. 21, 2005, and Austrian Patent Application No. A 1865/2004, filed Nov. 9, 2004, in the Austrian Patent Office, the disclosures of which are incorporated herein by reference.

BACKGROUND OF THE INVENTION

1. Field of the Invention

The invention relates to a method for the user-specific initialization of identification devices in the field and to a system for the user-specific initialization of identification devices in the field.

2. Description of the Related Art

In identification, authorisation, identity-establishing and charging systems comprising a control centre and distributed mobile identification devices, the identification devices are conventionally manufactured without being assigned to a user identifier and are only initialized with the particular user identifier on issue and handed over to the user. Initialization here proceeds either at distributed or central initialization stations.

The disadvantage of the conventional solution is that either initialization stations with a data link to the central facility must be set up at many points of issue, or elaborate logistical systems are required to distribute the initialized identification devices to the correct user.

SUMMARY OF THE INVENTION

The object of the invention is to make it possible to provide secure personalization or user-specific initialization of an identification device without costly distributed initialization stations and without the elaborate logistical arrangements involved in distributing pre-initialized identification devices.

Aspects of the invention provide a method for the user-specific initialization of identification devices from a central facility, each identification device having a unique device identifier in the shipped state, to which is assigned a unique user identifier in the central facility, the method comprising: on the basis of the device identifier and the user identifier, generating an initialization PIN in the central facility and transferring the initialization PIN to the identification device, and calculating from the initialization PIN, in the identification device with reference to the device identifier thereof, the user identifier for user-specific initialization.

Aspects of the invention also provide a system for the user-specific initialization of identification devices, comprising: at least one identification device with a unique device identifier in the shipped state, a memory for accommodating a user identifier in the initialized state, and a display and/or transmitter for the latter, and a central facility with a facility for generating initialization PINs from in each case a pair comprising a device identifier and an assigned user identifier and for transferring the generated initialization PIN to an identification device, wherein the identification device calculates and stores the user identifier from the transferred initialization PIN with reference to its device identifier and, on request, displays and/or transmits it.

In this way, an identification device with any desired device identifier may be shipped to the user and be personalized on site by the user by means of the initialization PIN. It is verified with the assistance of the initialization PIN whether the assignment of the identification device's own device identifier matches the information about the device identifier transferred in the initialization PIN. In the event of a match, the user identifier is calculated from the initialization PIN and said user identifier is displayed on the identification device. In this manner, the initialization procedure of the identification device is complete and for example data exchange between the identification device and the central facility is enabled. Due to the transfer of the initialization PIN, no elaborate initialization stations for initializing the identification devices are necessary.

In a preferred embodiment of the method according to the invention, a deinitialization PIN, which is handled like the initialization PIN, is generated for resetting the identification device to the shipped state. After deinitialization, the identification device is again ready for renewed initialization.

In a further embodiment, the identification device's device identifier may consist of a public part and a private (secret) part. The public part of the device identifier is set during manufacture and is both printed on the housing of the identification devices and stored in the identification device. The private part of the device identifier is also set during manufacture and stored in the identification device. The private part of the device identifier may be a random number or another number calculated in accordance with a specific algorithm. The public and the private part of the device identifier are notified to the central facility before shipment.

A further development of the invention provides that, for security reasons, an encryption method is used during generation of the initialization PIN or deinitialization PIN, and the initialization PIN or deinitialization PIN is correspondingly decrypted in the identification device.

The initialization PIN or deinitialization PIN may be notified to the user and entered manually by the latter by means of a keypad on the identification device; alternatively, it may be transferred from the control centre to the identification device, for example via a radio interface.

A further embodiment of the invention is that the method according to the invention is used in the automatic recording of vehicle journeys or routes, in order to calculate tolls therefrom and to generate traffic telematics data for analysis of traffic flows. In this case, a vehicle device (onboard unit, OBU) which has a device identifier and an assigned user identifier, for example the motor vehicle registration number, is assigned to each vehicle. These vehicle devices are issued at distributed outlets, for example petrol stations, customs offices, ports etc., and the initialization PIN is notified to the user by the method according to the invention. After input of the initialization PIN into the identification device, the latter is ready to record journeys and traffic telematics data and to transfer them to the central facility. The initialization PIN may also be sent from the central facility to the identification device and initialization may proceed either entirely automatically or semi-automatically. In the case of semi-automatic initialization, a display indicates to the user that initialization has taken place. In the case of semi-automatic initialization, the user identifier is displayed, and the initialization and user identifier have to be confirmed by the user.

According to a further variant of the invention, after initialization the identification device may be deactivated and activated again, for example when the vehicle subject to toll leaves the toll area. After deactivation, all initialization data are retained in the identification device, but recording of the journey and traffic telematics data is suspended. Activation and deactivation may, as for initialization, proceed manually, semi-automatically or automatically by means of an activation PIN or deactivation PIN.

Another feature of the invention is that the initialization PIN also contains user-specific, functional class-of-service data and information, such as for example vehicle pollutant class, number of axles or maximum admissible gross weight. User-specific class-of-service data and information in the identification device may furthermore be modified by means of a class-of-service PIN.

After initialization, the identification device transmits data to the central facility and receipt of the data is confirmed with a confirmation PIN.

The activation PIN, deactivation PIN, entitlement PIN or confirmation PIN are generated, as in the case of initialization, in accordance with the method according to the invention.

In a further development of the invention, the link, which is at least in part a radio link, between the mobile identification device and a fixed radio station may be a microwave radio channel; Dedicated Short Range Communication (DSRC); a radio channel or a mobile radio channel, for example GSM, UMTS or a wireless data link, for example WLAN, WiMAX.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
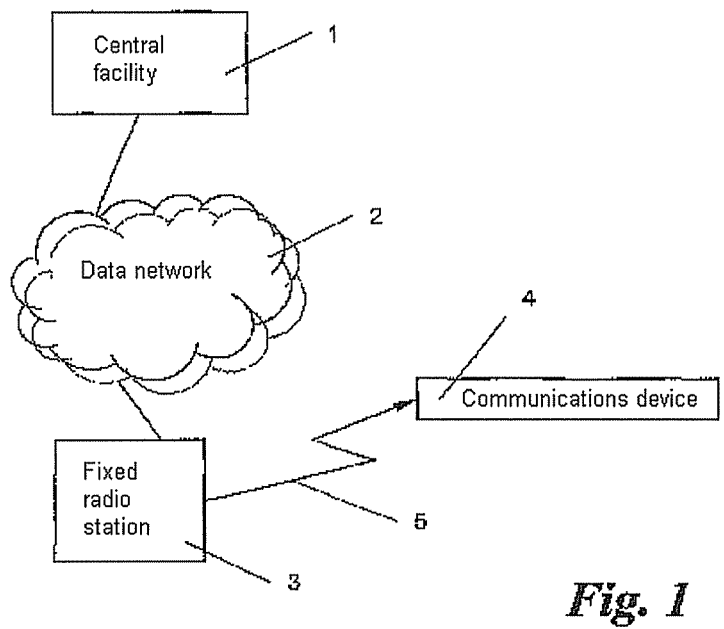
FIG. 1 shows the schematic structure of the system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a schematic representation of the system. This exemplary embodiment looks more closely at a road toll system. The invention is, however, not restricted solely to these systems, but may be used for any communications systems in which distributed devices are either automatically or manually initialized from a control centre, in so doing assigning a unique user identifier (for example in this exemplary embodiment the motor vehicle registration number) to a device identifier (for example serial number) of a distributed identification device.

The system according to FIG. 1 consists of a central facility 1 for collecting the data from the identification devices 4 and for preprocessing and forwarding them to a charging centre (not shown). The central facility is connected via a public data network 2 to regionally located fixed radio stations 3. The radio stations 3 may be beacons for microwave or DSRC communication with the identification devices 4, base stations of a mobile radio network or access nodes of a WLAN or a WiMAX Internet connection. A combination of these technologies for bidirectional data transmission between identification devices 4 and fixed radio stations 3 is also possible.

Figure 2:
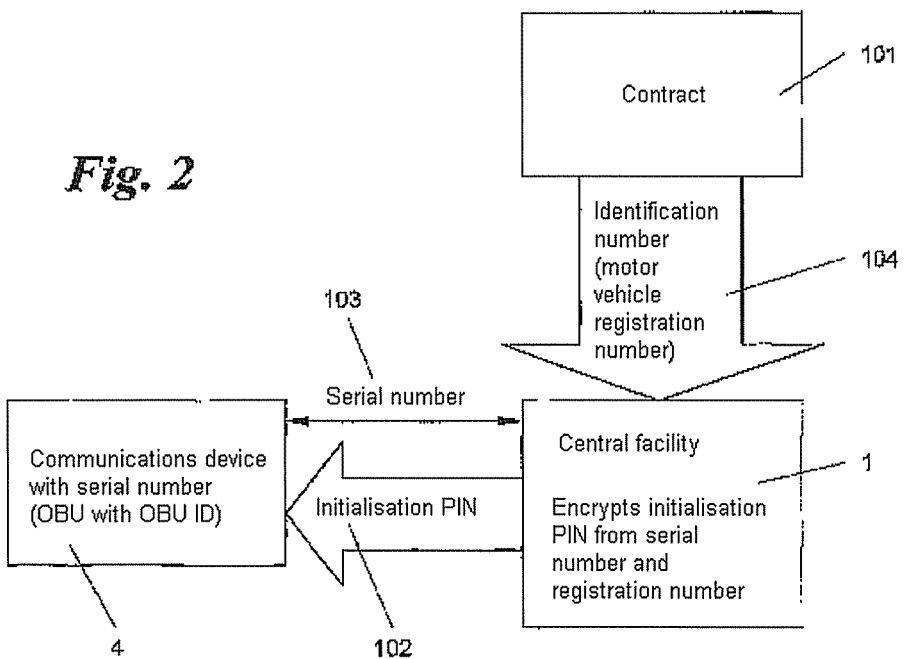
FIG. 2 is a schematic diagram of the initialization procedure.

The identification devices are shipped to distribution warehouses. As required, a user (for example a haulier) concludes a contract 101 (FIG. 2) with an operator of the central facility (for example a road toll operator), and he is assigned an identification device 4 with a unique device identifier 103. Said latter identifier and the user identifier 104 (for example the motor vehicle's registration number) are simultaneously transferred via a communications system (not shown in FIG. 1) to the central facility 1. The central facility 1 generates an initialization PIN 102 from the device identifier 103 and the user identifier 104, which initialization PIN contains the two identifiers and optionally further class-of-service data. In the present exemplary embodiment, such class-of-service data may inter alia be the vehicle's environment class or also its number of axles.

The initialization PIN is transferred to the user, for example via a data network or by a telephone call, and entered into the identification device 4 by the user. Alternatively, the initialization PIN may be transmitted directly from the central facility 1 to the identification device.

If the identification device's own device identifier matches the device identifier transferred in the initialization PIN, the identification device is user-specifically initialized or personalized and so enabled for the intended operation. While in operation, the identification device collects data, for example journeys, and transfers such data via the radio interface 5, a fixed radio station 3 and the data network 2 to the central facility for further evaluation.

Figure 3:
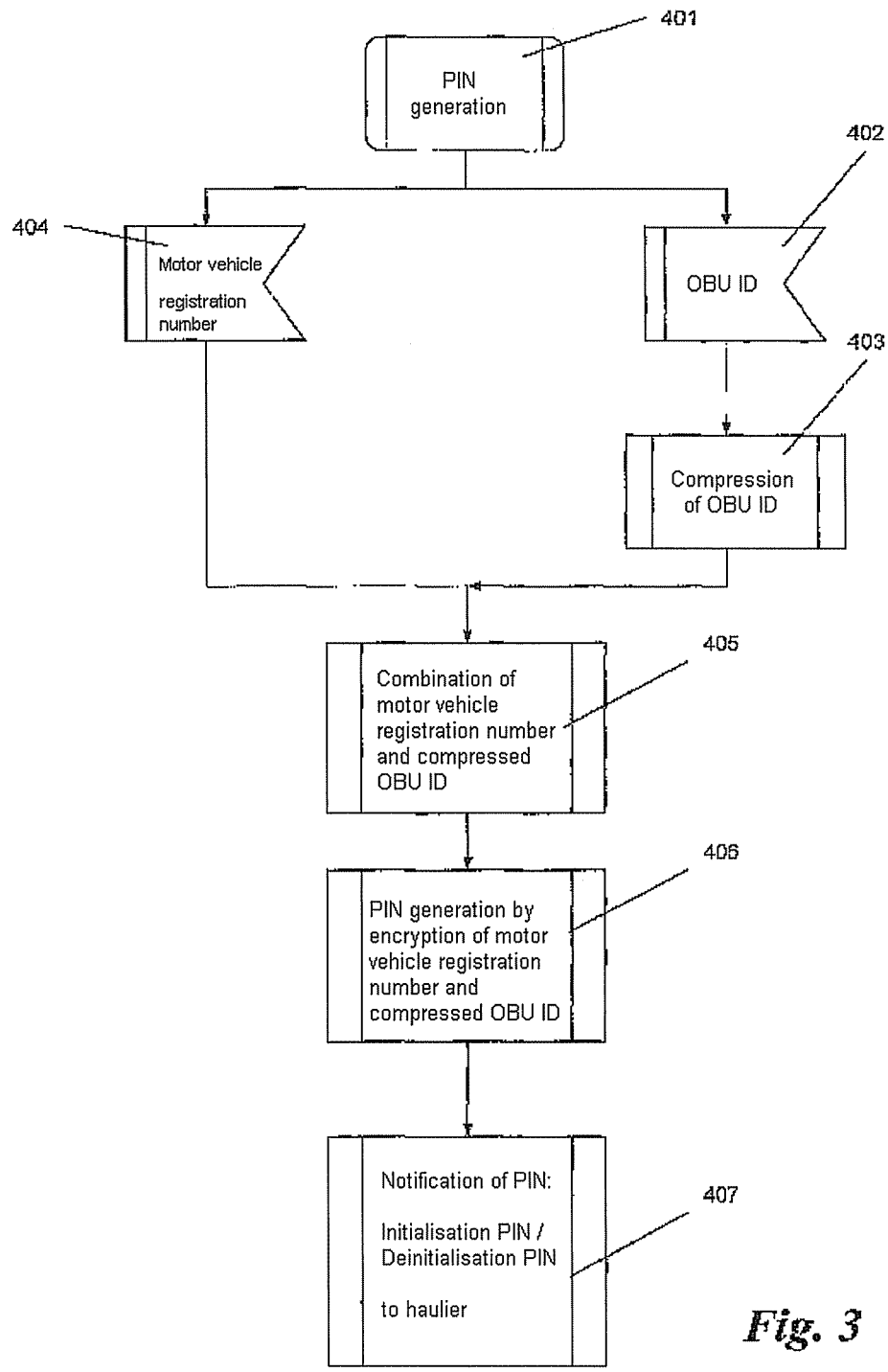
FIG. 3 is a flow diagram of PIN generation.

FIG. 3 describes the generation of the initialization PIN 401 with reference to the exemplary embodiment of the road toll. The OBU ID 402 corresponds to the device identifier of the identification device and, in the embodiment not shown in greater detail in FIG. 3, the device identifier 103 may consist of a public part and a private part. The public part of the device identifier is set during manufacture of the identification device and is, for example, both printed on the housing of the identification device and stored in the identification device. The private part of the device identifier 402 is also set during manufacture and stored in the identification device. The private part of the device identifier may be a random number or another number calculated in accordance with a specific algorithm. The public and the private part of the device identifier are notified to the central facility 1 before shipment of the identification device. In the present exemplary embodiment, on conclusion of a contract, i.e. on assignment of a user with his user identifier to an identification device with a device identifier, only the public part of the device identifier is passed on to the central facility 1 and this complements the private part of the device identifier for calculation of the initialization PIN.

In a further variant, the device identifier may be compressed (403) in order to simplify the further steps.

On generation of the initialization PIN, the motor vehicle registration number 404, which in the present case corresponds to the user identifier, and the OBU ID 403 are combined (405) with one another and encoded by means of an encryption method 406. In order to initialize the identification device, the initialization PIN is transferred to the user (in the present case, haulier) for input into the identification device 407.

On termination of the contract, a deinitialization PIN is generated using the same method, the step for transferring the device identifier 103 of the identification device being omitted as the assignment is already known to the central facility. Deinitialization resets all contractual and user-specific data in the identification device, such that the identification device is prepared for renewed initialization.

Figure 4:
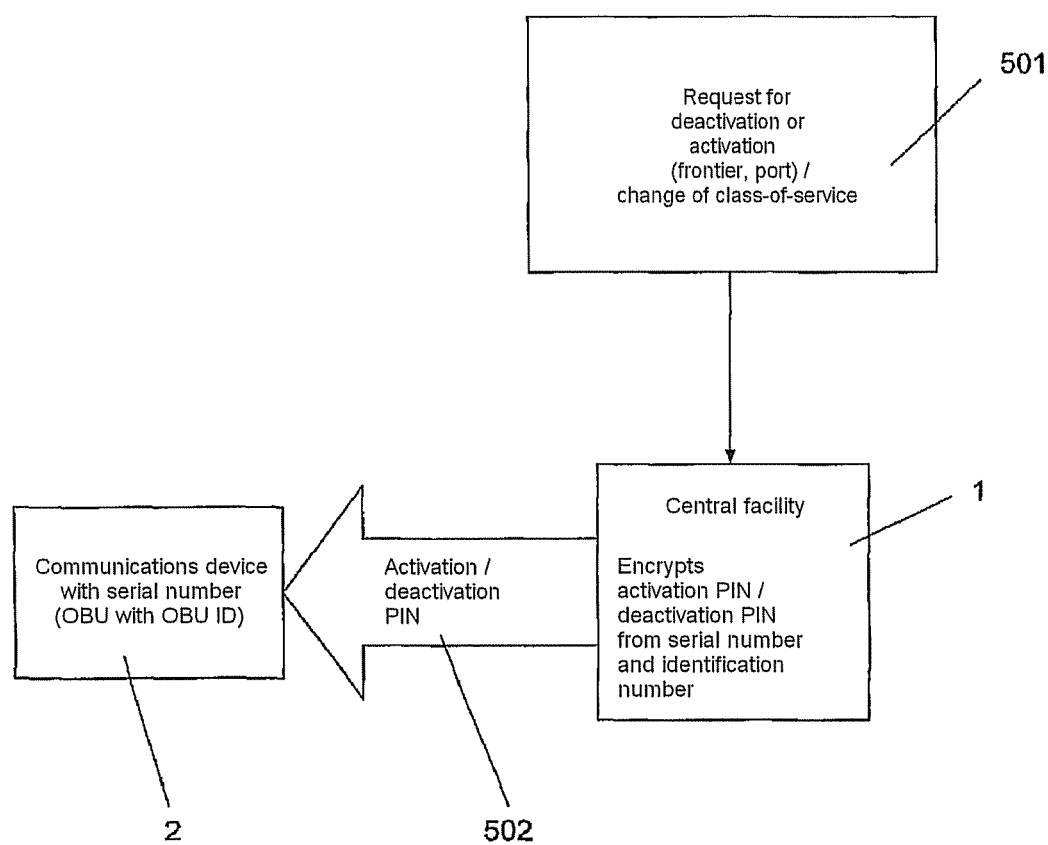
FIG. 4 is a schematic diagram of the activation procedure.

In specific cases, it is necessary for the identification device to be deactivated, for example if the vehicle leaves the zone subject to toll, and to be reactivated on return at a subsequent time (see FIG. 4). To this end, a request 501 is made to the central facility 1, either automatically via the radio interface 5 and the data network 2 on departure from the zone subject to toll or after a manual request, for example a telephone call to the call centre of the central facility 1. In any event, the central facility produces a deactivation PIN 502 from the device identifier and user identifier, the same method being used as was used for generation of the initialization PIN. The deactivation PIN 502 is either transmitted automatically via the data network 2 and the radio interface 3 to the identification device 4 and the identification device 4 is automatically deactivated, or, in the case of the manual request, the user is notified of the deactivation PIN 502 and enters said PIN into the identification device 4 in order to deactivate the identification device 4.

Renewed activation of the identification device 4 proceeds in accordance with the same method as the deactivation according to FIG. 4 by means of an activation PIN.

Class-of-service data in the identification device are likewise changed in accordance with the method for deactivation of the identification device according to FIG. 4 by means of a class-of-service PIN.

The traffic telematics data are transmitted via the radio interface 3 and the data network 2 to the central facility 1 and the central facility 1 provides automatic confirmation by means of a confirmation PIN. Should this not occur, the user has the option to request the confirmation PIN manually in accordance with the method of FIG. 4 and, after receipt of said PIN, effect manual confirmation by input of the confirmation PIN.

The invention is obviously not limited to the area of application of road toll systems which has been discussed by way of example, but may also be used for any desired kind of identification devices, which, for the purposes of simple mass production, stock control and tamper-proof distribution, are to be shipped in a non-personalized state and to be user-specifically initialized or personalized on site in a simple, secure and transparent manner in order to become valid for identification or authorisation purposes. Examples of such further applications are the personalisation of electronic vehicle or user IDs or of smart cards or RFID tags for identification or identity-establishing purposes.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for user-specific initialization of identification devices, from a central facility, each identification device storing a unique device identifier in the shipped state, to which is assigned a unique user identifier stored in the central facility, the method comprising:
 generating in the central facility an initialization PIN including the device identifier and the user identifier, and transferring the initialization PIN to the identification device, and
 calculating from the transferred initialization PIN, in the identification device with reference to the device identifier stored therein, the user identifier for user-specific initialization,
 wherein the user identifier is not received by the identification device prior to the transferred initialization PIN being transferred from the central facility to the identification device.

2. The method according to claim 1, further comprising the identification device displaying the calculated user identifier or transmitting the calculated user identifier on request.

3. The method according to claim 1, wherein:
 the device identifier stored in the identification device comprises a public part and a private part,
 the method further comprises transmitting from the identification device to the central facility the public part of the device identifier but not the private part of the device identifier, and
 the generating the initialization PIN comprises, in response to the received public part of the device identifier, generating and transmitting the initialization PIN comprising the private part of the device identifier, the public part of the device identifier, and the user identifier.

4. The method according to claim 3, wherein the private part of the device identifier is formed of a random number or by an algorithm.

5. The method according to claim 1, further comprising generating, in the central facility, a deinitialization PIN for resetting the initialization of the identification device.

6. The method according to claim 1, further comprising, for valid initialization of the identification device, comparing the device identifier transferred with the initialization PIN with the device identifier of the identification device.

7. The method according to claim 1, wherein the initialization PIN also comprises functional class-of-service data and information of the identification device.

8. The method according to claim 1, further comprising:
 an encryption method to generate the initialization PIN and any possible deinitialization PIN; and
 decrypting the initialization PIN and the deinitialization PIN in the identification device.

9. The method according to claim 1, wherein the method further comprises, after initialization, deinitializing the identification device before renewed initialization.

10. The method according to claim 1, further comprising manually inputting, or transmitting via a radio interface, the initialization PIN or any possible deinitialization PIN into/to the identification device .

11. The method according to claim 1, wherein the identification device is a vehicle device of a traffic telematics system.

12. The method according to claim 11, wherein the vehicle device is an onboard unit and the traffic telematics system is a road toll system.

13. The method according to claim 1, further comprising establishing a radio link between the identification device and central facility comprising at least in part a microwave radio link.

14. The method according to claim 1, further comprising establishing a radio link between the identification device and central facility comprising at least in part a DSRC radio link.

15. The method according to claim 1, further comprising establishing a radio link between the identification device and central facility comprising at least in part a mobile radio system, a GSM or a UMTS system.

16. The method according to claim 1, further comprising establishing a radio link between the identification device and central facility comprising is at least in part a wireless data link, a WLAN or a WiMAX data link.

17. The method according to claim 1, further comprising the central facility generating, on request, an activation or deactivation PIN for the initialized identification device.

18. The method according to claim 1, further comprising the central facility generating, on request, a class-of-service PIN for the initialised identification device, for changing the class-of-service data and information of the identification device.

19. The method according to claim 1, further comprising returning a confirmation PIN for the data transmitted from the identification device to the central facility.

20. A system for user-specific initialization of identification devices, comprising:
   at least one identification device storing a unique device identifier in the shipped state, a memory for accommodating a user identifier in the initialized state, and a display and/or a transmitter, and
   a central facility with a facility for generating initialization PINs from in each case a pair comprising a device identifier and an assigned user identifier and for transferring the generated initialization PIN including the pair comprising the device identifier and the assigned user identifier, to an identification device having the device identifier,
   wherein:
      the identification device calculates and stores in the memory the user identifier from the transferred initialization PIN with reference to the device identifier stored in the memory in the shipped state and, on request, displays and/or transmits it, and
      the identification device does not receive the user identifier prior to the identification device receiving the transferred initialization PIN from which the identification device calculates and stores the user identifier.

21. The system according to claim 20, wherein the identification device comprises an input device for inputting the initialization PIN and further deinitialization PINs, activation PINs, deactivation PINs, class-of-service PINs and/or confirmation PINs.

22. The system according to claim 20, wherein the central facility comprises an encryption facility for encrypting the initialization PIN and further deinitialization PINs, activation PINs, deactivation PINs, class-of-service PINs and/or confirmation PINs and the identification device comprises a decryption facility for the corresponding decryption.

23. The system according to claim 20, wherein the identification device is a vehicle device of a traffic telematics system.

24. The system according to claim 23, wherein the traffic telematics system is a road toll system.

25. The system according to claim 20, wherein a radio link is established between the identification device and central facility and includes at least in part a microwave radio link.

26. The system according to claim 20, wherein a radio link is established between the identification device and central facility and includes at least in part a DSRC radio link.

27. The system according to claim 20, wherein a radio link is established between the identification device and central facility and includes at least in part a mobile radio system, a GSM or a UMTS system.

28. The system according to claim 20, wherein a radio link is established between the identification device and central facility and includes at least in part a wireless data link, a WLAN or a WiMAX data link.

* * * * *

UNITED STATES PATENT AND TRADEMARK OFFICE
CERTIFICATE OF CORRECTION

| | | |
|---|---|---|
| PATENT NO. | : 9,098,950 B2 | Page 1 of 1 |
| APPLICATION NO. | : 11/718676 | |
| DATED | : August 4, 2015 | |
| INVENTOR(S) | : Bernd Eberstaller | |

It is certified that error appears in the above-identified patent and that said Letters Patent is hereby corrected as shown below:

In the claims

In column 6, line 48, in claim 10, delete "device ." and insert -- device. --, therefor.

In column 7, line 1, in claim 16, after "comprising" delete "is".

In column 7, lines 24-25, in claim 20, delete "identifier," and insert -- identifier --, therefor.

Signed and Sealed this
Second Day of February, 2016

Michelle K. Lee
*Director of the United States Patent and Trademark Office*